US007003950B1

(12) United States Patent
Holder et al.

(10) Patent No.: US 7,003,950 B1
(45) Date of Patent: Feb. 28, 2006

(54) ELECTRONIC CONTROL SYSTEM FOR A HYDRAULIC PUMP

(75) Inventors: Lonnie E. Holder, Sullivan, IL (US); Raymond M. Hauser, Sullivan, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 10/924,679

(22) Filed: Aug. 24, 2004

Related U.S. Application Data

(63) Continuation of application No. 10/290,620, filed on Nov. 7, 2002, now Pat. No. 6,955,046.

(51) Int. Cl.
*F16D 39/00* (2006.01)

(52) U.S. Cl. .......................................... 60/487; 60/488

(58) Field of Classification Search .................. 60/487, 60/488

See application file for complete search history.

(56) References Cited

U.S. PATENT DOCUMENTS

| | | | | |
|---|---|---|---|---|
| 3,943,792 | A | | 3/1976 | Sibeud |
| 4,140,031 | A | | 2/1979 | Sibeud et al. |
| 4,339,962 | A | | 7/1982 | Babel |
| 4,493,228 | A | | 1/1985 | Vokovich et al. |
| 4,567,969 | A | | 2/1986 | Makita |
| 4,664,217 | A | | 5/1987 | Welch et al. |
| 4,817,471 | A | | 4/1989 | Tury |
| 4,841,793 | A | | 6/1989 | Leigh-Monstevens et al. |
| 4,843,901 | A | | 7/1989 | Peterson et al. |
| 4,875,390 | A | * | 10/1989 | Hayashi et al. ............... 60/445 |
| 4,922,769 | A | | 5/1990 | Tury |
| 4,923,027 | A | | 5/1990 | Hayashi et al. |
| 4,971,535 | A | | 11/1990 | Okada et al. |
| 4,980,668 | A | | 12/1990 | Leigh-Monstevens |
| 5,014,038 | A | | 5/1991 | Leigh-Monstevens et al. |
| RE34,064 | E | | 9/1992 | Tury et al. |
| 5,147,010 | A | | 9/1992 | Olson et al. |
| 5,450,054 | A | | 9/1995 | Schmersal |
| 5,540,560 | A | | 7/1996 | Kimura et al. |
| 5,741,202 | A | | 4/1998 | Huber |

(Continued)

*Primary Examiner*—Thomas E. Lazo
(74) *Attorney, Agent, or Firm*—Neal, Gerber & Eisenberg LLP

(57) ABSTRACT

A system and method for electronically controlling the displacement of hydraulic pumps, IHTs or HSTs. The IHT and HST includes a hydraulic transmission mounted within the casing that includes a rotatable hydraulic pump in fluid communication with a rotatable hydraulic motor and a moveable swash plate cooperable with the rotatable hydraulic pump for controlling the speed and direction of rotation of the rotatable hydraulic motor. The rotation of the hydraulic motor is used to drive an axle shaft. For controlling the positioning of the swash plate, the transaxle further includes a rotatable trunnion arm coupled to the moveable swash plate. The rotatable trunnion arm extends from the casing and is coupled to a control arm. The control arm is further connected to the electronic actuation drive, which is mounted to the casing and is used to electronically control the rotation of the rotatable control arm to change the orientation of the swash plate and to change the speed and direction of rotation of the rotatable hydraulic motor.

31 Claims, 11 Drawing Sheets

U.S. PATENT DOCUMENTS

| | | | |
|---|---|---|---|
| 5,819,537 | A | 10/1998 | Okada et al. |
| 5,984,828 | A | 11/1999 | Huber |
| 6,016,717 | A | 1/2000 | Wheeler |
| 6,109,033 | A | 8/2000 | Folsom et al. |
| 6,122,996 | A | 9/2000 | Hauser et al. |
| 6,145,399 | A | 11/2000 | Bockmann et al. |
| 6,151,978 | A | 11/2000 | Huber |
| 6,167,996 | B1 | 1/2001 | Huber et al. |
| 6,295,887 | B1 | 10/2001 | DeJong et al. |
| 6,481,203 | B1 | 11/2002 | Johnson et al. |
| 2001/0035014 | A1 | 11/2001 | Yano et al. |
| 2002/0002825 | A1 | 1/2002 | Takada et al. |
| 2002/0034994 | A1 | 3/2002 | Johnson et al. |

* cited by examiner

ELECTRONIC CONTROL SYSTEM FOR A HYDRAULIC PUMP

CROSS-REFERENCE TO RELATED APPLICATION

This patent application is a continuation application of and claims priority from U.S. Pat. No. 6,955,046, filed Nov. 7, 2002. This patent is incorporated herein by reference in its entirety. This application is also related to App. Ser. No. 10/924,526, filed Aug. 24, 2004 and also claiming priority from U.S. Pat. No. 6.955,046.

BACKGROUND OF THE INVENTION

This invention relates generally to hydraulic pumps and axle driving apparatus and, more particularly, to a system for electric actuation of such devices, including electronic circuitry to automatically drive the axle driving apparatus to a neutral position.

Hydraulic pumps, transaxles, hydrostatic transmission assemblies ("HSTs") and integrated hydrostatic transaxles ("IHTs") are known in the art. Generally, these devices include an end cap or a center section on which is mounted a rotating hydraulic pump and, in some applications, a rotating hydraulic motor. The hydraulic pump and the hydraulic motor each carry a plurality of reciprocating pistons, which are in fluid communication through hydraulic porting formed in the center section or through hoses to a separate hydraulic motor. Rotation of the hydraulic pump against a moveable swash plate creates an axial motion of the pump pistons that forces an operating oil through the hydraulic porting or hoses to the hydraulic motor to move the motor pistons. The axial motion of the motor pistons causes the hydraulic motor to rotate as the motor pistons bear against a thrust bearing. In this manner, the rotation of the hydraulic motor may be used to drive the vehicle axles of a riding lawn mower, small tractor and the like. Separate hydraulic motors such as geroller, radial piston, and gerotor are also known and similarly function to drive a motor output shaft or one or more axles.

To adjust the speed and direction of rotation of the hydraulic motor and, accordingly, the speed and direction of rotation of the vehicle axles, the position of the swash plate with respect to the hydraulic pump pistons may be changed. The orientation with which the swash plate addresses the hydraulic pump pistons can be changed to control whether the hydraulic motor rotates in the forward direction or in the reverse direction. Additionally, the angle at which the swash plate addresses the hydraulic pump pistons can be changed to increase or decrease the amount of operating oil that is forced from the hydraulic pump to the hydraulic motor to change the speed at which the hydraulic motor rotates.

For use in changing the position of the moveable swash plate, it is known to include a trunnion arm that is coupled to the swash plate. A speed change lever or a speed change pedal is, in turn, coupled to the trunnion arm through a series of rods and levers or other driving link. In this manner, movement of the speed change lever/pedal results in movement of the trunnion arm to change the position of the swash plate to thereby control the speed and direction of the vehicle. Examples of such mechanisms for adjusting the speed of a vehicle may be seen in U.S. Pat. Nos. 6,122,996 and 5,819,537, which are incorporated herein by reference in their entirety. While these mechanisms for adjusting the speed of a vehicle have worked for their intended purpose, they require additional linkage, which limits the flexibility and ease of transaxle installation, and are more difficult for operators to control because of the control moments associated with the additional linkage.

For placing the swash plate in a position that neither affects the speed nor the direction of rotation of the hydraulic motor, i.e., the neutral position, some hydraulic pumps or hydraulic transaxles provide a return to neutral mechanism that is normally implemented as an integral part of the vehicle linkage. While these return to neutral mechanisms work for their intended purpose, they do suffer disadvantages. For example, these known return to neutral mechanisms require complex, costly linkages that require substantial assembly time. These known mechanisms also fail to allow for flexibility with respect to the type and orientation of driving linkages that may be used in connection with the hydraulic pump.

SUMMARY OF THE INVENTION

To overcome these disadvantages, the present invention is realized in a system and method for electrically controlling the displacement of hydraulic pumps, IHTs or HSTs. Each of these devices includes a variable hydraulic pump mounted within the casing that is in fluid communication with a rotatable hydraulic motor, which may also be included within the same casing as the motor or may be located in a separate casing, and a moveable swash plate cooperable with the rotatable hydraulic pump for controlling the speed and direction of rotation of the rotatable hydraulic motor. The rotation of the hydraulic motor is used to drive an output shaft which may consist of one or more axle shafts.

For controlling the positioning of the swash plate, the transaxle also includes a rotatable trunnion arm coupled to the moveable swash plate 56. The rotatable trunnion arm is also coupled to a control arm. The control arm is further connected to an electronic actuation drive, which is mounted either internally or externally with respect to the casing, and is used to control the rotation of the control arm and swash plate. The orientation of the swash plate may be changed to control the speed and direction of rotation of the hydraulic motor.

In an alternative embodiment of the present invention, the drive will be interlocked with circuitry to automatically return the swash plate to a neutral position under certain predefined conditions. A circuit will also be described to prevent re-activation of the electric drive until the control handle is returned to the neutral position.

The drive will be described in the context of a linear actuator, however, in a further embodiment, a motor driving a worm gear will be described. In an additional embodiment, a motor driving a spur gear reduction configuration will be described.

A better understanding of the objects, advantages, features, properties and relationships of the invention will be obtained from the following detailed description and accompanying drawings which set forth an illustrative embodiment and which are indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION OF THE DRAWINGS

Figure 1:
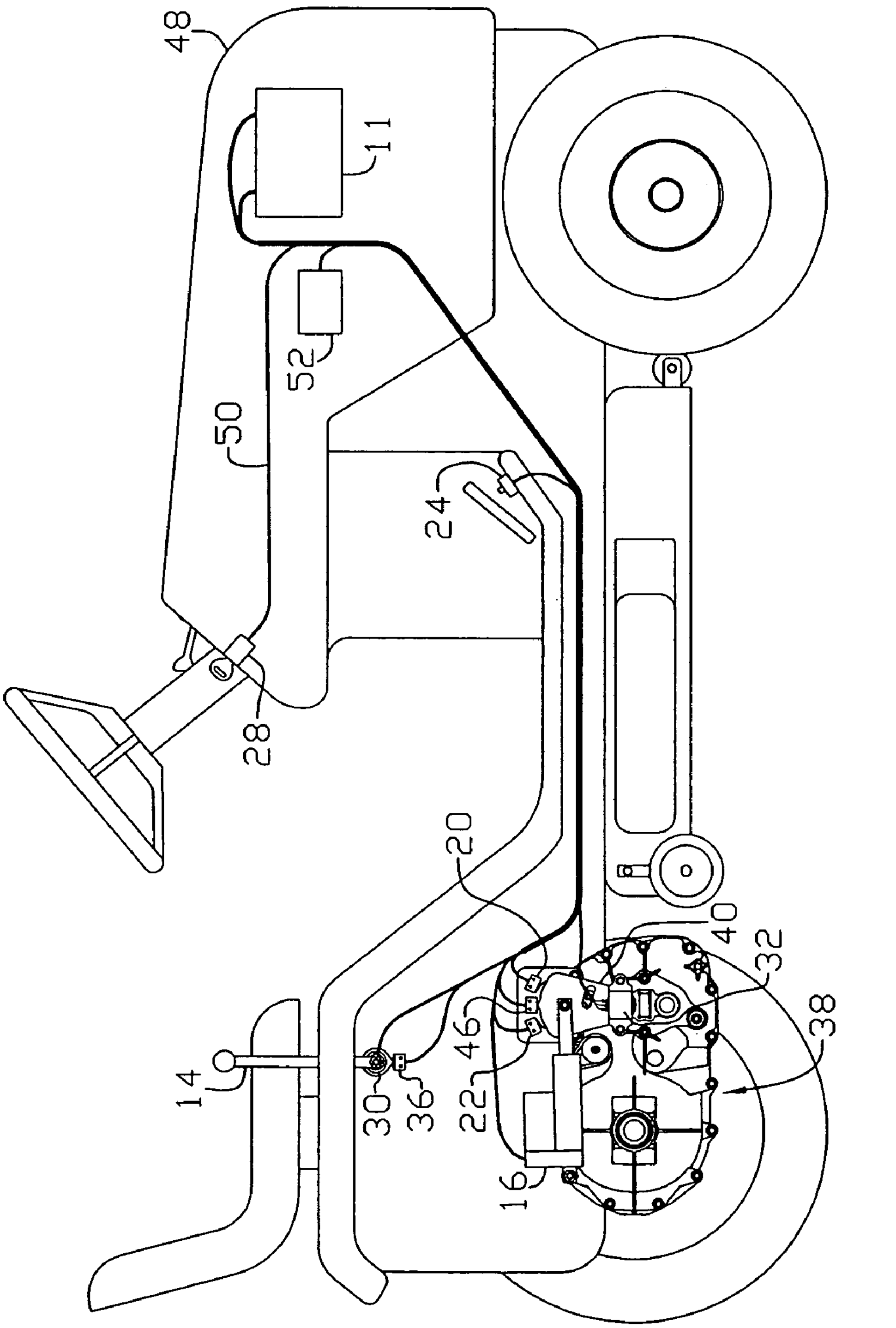
FIG. 1 is a plan view of a tractor with a simplified representation of an Integrated Hydrostatic Transmission and other components for operating the tractor.
Figure 2:
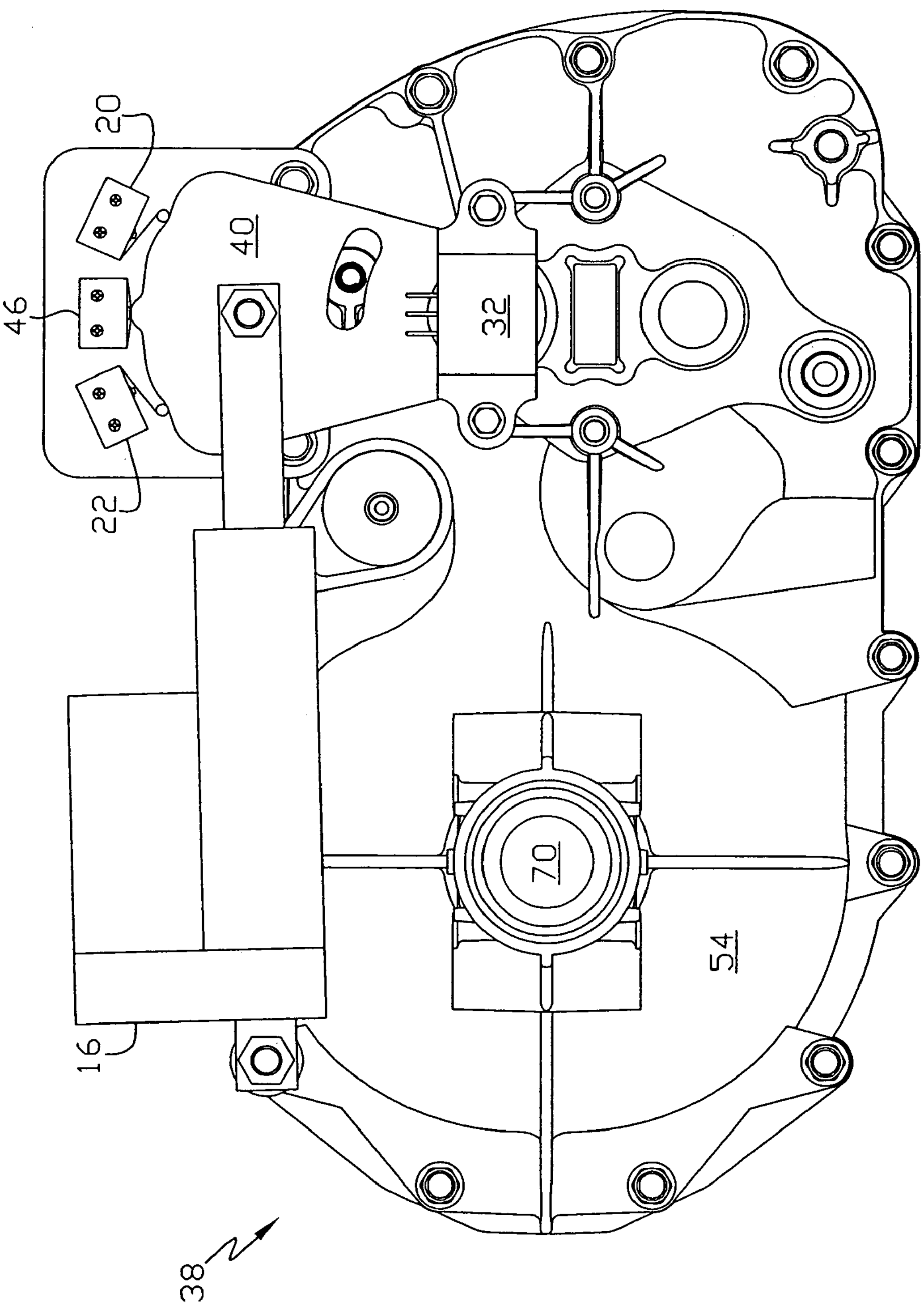
FIG. 2 is a close up view of the IHT shown in FIG. 1 without any wiring.
Figure 7:
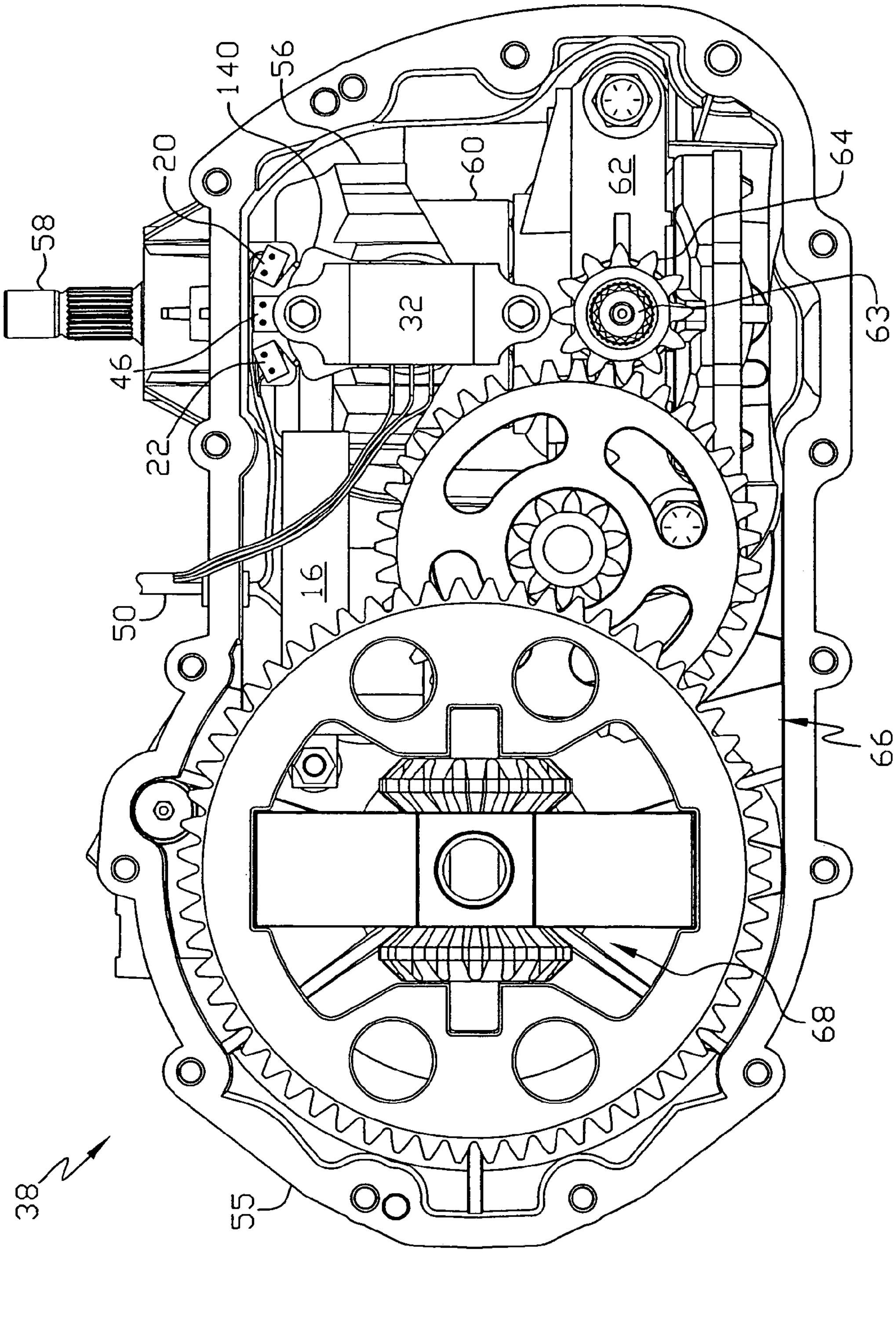
FIG. 7 is a side view of the IHT shown in FIG. 2 with the side portion of the housing removed and with the actuator located inside the housing.

Turning now to the figures, wherein like reference numeral refer to like elements, there is illustrated an electronic actuation drive 10 ("EAD") for electrically controlling the displacement of a hydraulic pump. The EAD 10 operates in combination with the general principle of an input shaft driving a hydraulic pump, which, through the action of its pistons, pushes oil to a hydraulic motor to cause the rotation of a motor shaft. The rotation of the motor shaft may directly drive a wheel or may be transferred through a gearing system or the like to drive one or more axle shafts 70. All that is required for this invention to be operative is a variable hydraulic pump. As shown in FIGS. 1, 2 and 7 and in order to simplify the explanation of the workings of this invention, it will be explained in the context of an IHT.

For adjusting the amount of oil that is pushed from the hydraulic pump 60 to the hydraulic motor, the hydraulic pump, HST or IHT includes a moveable swash plate 56 against which the pump pistons travel. As will be understood by those of ordinary skill in the art, the swash plate 56 may be moved to a variety of positions to vary the stroke of the pump pistons and the direction of rotation of the hydraulic motor. As the stroke of the pump pistons is varied, the volume of the hydraulic fluid pumped into the hydraulic porting of the center section 62 will vary. Since the speed of rotation of the hydraulic motor is dependent upon the amount of hydraulic fluid pumped into the motor by the hydraulic pump 60, and the direction of rotation of the hydraulic motor is dependent upon the positioning of the swash plate 56, the swash plate 56 is seen to control the speed and direction of rotation of the hydraulic motor and, accordingly, the speed and direction of rotation of axle shafts 70.

For moving the swash plate 56, the swash plate 56 is connected to a moveable trunnion arm that is rotatably supported in the casing of the HST or IHT. As will be appreciated by those with skill in the art, rotation of the trunnion arm changes the angular orientation of the swash plate 56 with respect to the pump pistons. In addition, a control arm 40 is coupled to the trunnion arm for rotating the trunnion arm. It should be appreciated that the control arm 40, the trunnion arm and the swash plate 56 each cooperate with one another so that movement of one of these elements will lead to a corresponding movement by the other elements.

To rotate the control arm 40 and, accordingly, move the swash plate 56, the EAD 10 is coupled to the control arm 40. The EAD 10 may also be connected to a worm gear, a spur gear or other similar means capable of controlling rotation of the control arm 40. A control handle 14, which may be a throttle, a lever, a pedal or similar means for controlling the movement of a vehicle, may be provided on a vehicle, whereby a signal representative of the movement of the control handle 14 is provided to the EAD 10 to cause the rotation of the control arm 40, the trunnion arm and the swash plate 56. The wiring to connect the various components is preferably located in a wiring harness 50.

Figure 3:
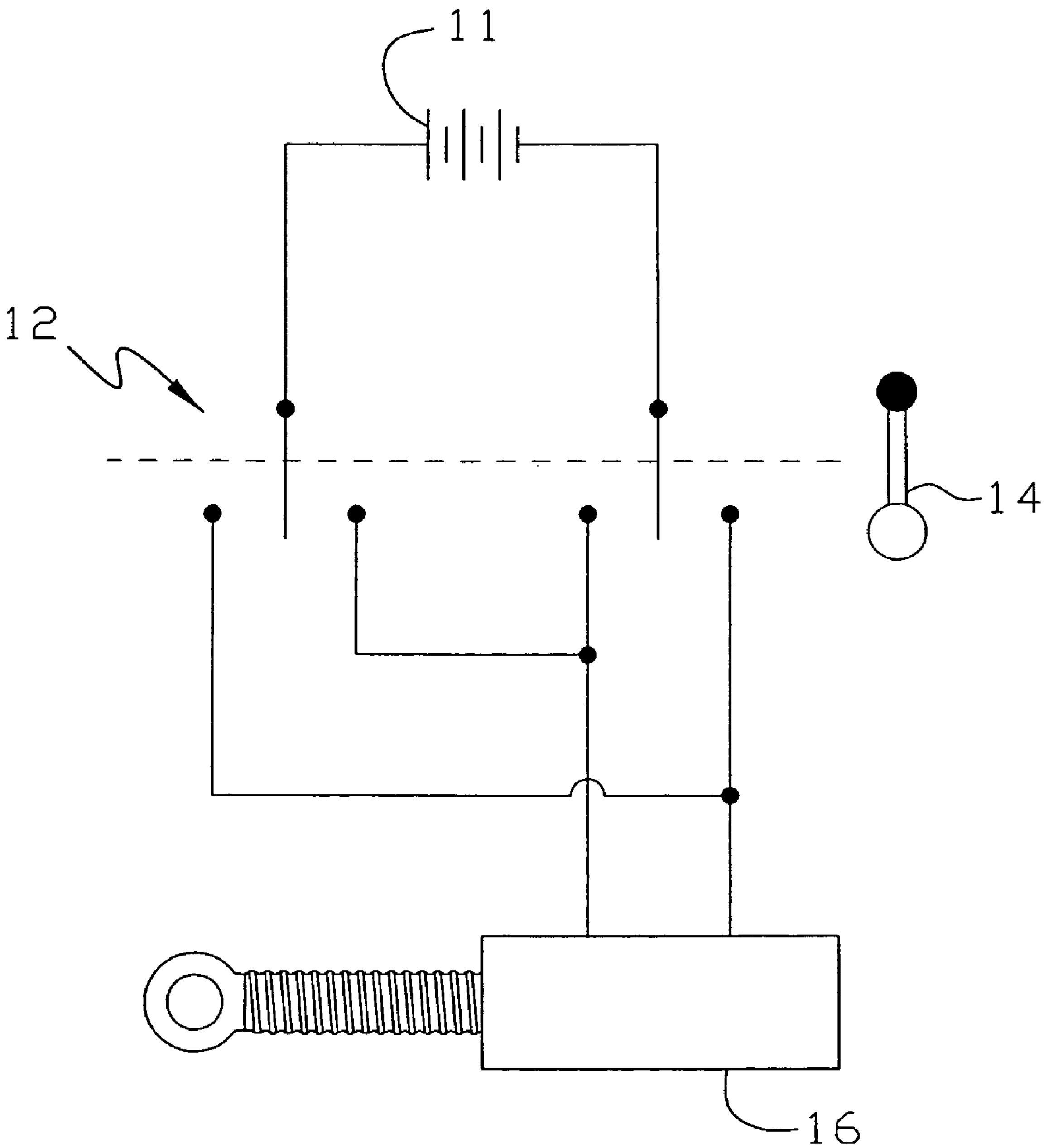
FIG. 3 is an electrical schematic for a drive system using a linear actuator.

For electrically rotating the control arm 40, illustrated in FIG. 3, a source of voltage, in this case a battery 11, is directed through a switch 12 to an electric drive 16. The electric drive 16 will be attached to the control arm 40 of a swash plate 56 associated with a hydraulic pump, either in a stand-alone unit or as part of an HST or IHT. In this embodiment the electric drive 16 is shown as a linear actuator, but it should be understood by those with skill in the art that the linear actuator may be replaced with a worm gear, spur gearing or similar means, as discussed in more detail below.

When an operator moves the control handle 14 in one direction, drive actuator switch 12 generates a voltage signal representative of the motion that is then provided to the drive 16. When handle 14 is returned to a neutral position, signal generation by the switch 12 ceases. In this manner, as will be described hereinafter, the vehicle will be caused to drive at the same speed until the handle is moved in the opposite direction to slow the vehicle down or to drive the vehicle in the opposite direction. While this fundamental circuitry demonstrates the principles of control, provisions may also be made for braking and stopping.

Figure 4:
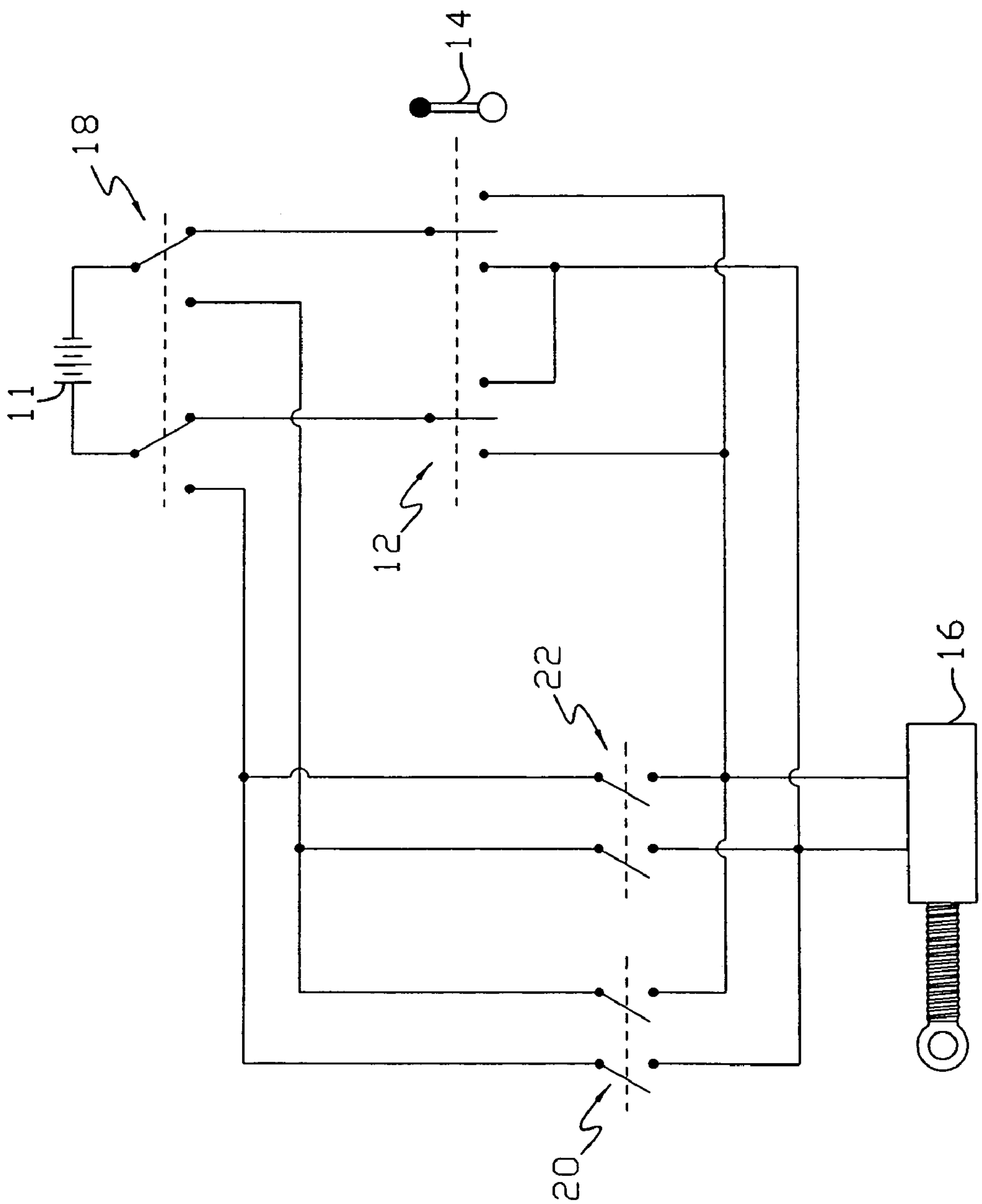
FIG. 4 is an electrical schematic illustrating an exemplary circuit for returning the drive system to a neutral state when a brake is engaged.

For controlling the operation of the drive 16 when the brake is activated, an exemplary brake circuit shown in FIG. 4 may be provided. In the illustrated example, when the vehicle brake is engaged, brake switch 18 will be activated. Activation of the brake switch 18 will, in turn, generate a voltage signal that is provided to forward sense switch 20 and reverse sense switch 22. The primary function of forward sense switch 20 and reverse sense switch 22 is to indicate whether the control arm 40 is physically in a forward or reverse vehicle driving position, which allows the drive 16 to return the control arm 40 to the neutral position, as described in greater detail below. Forward sense switch 20 and reverse sense switch 22 are preferably associated with the HST/IHT control arm 40 as shown in FIGS. 1 and 2, but it should be appreciated that they may also be attached to any linkage associated with the control arm 40, such as the linkage attaching drive 16 to control arm 40 or the swash plate 56 inside the housing for the pump 60. Switches 20, 22 may also be located inside or outside of the housing.

If the HST/IHT control arm 40 has been moved into a position that would cause the vehicle to move forward, forward sense switch 20 will be closed. Once the brake is engaged, brake switch 18 will be activated and the voltage signal generated by the brake switch 18 will be supplied to actuator 16 through switch 20. Since the polarity of the voltage signal that is supplied through the activated brake switch 18 is in the opposite direction of the respective switch 20, 22 that is activated, the voltage signal directed through brake switch 18 will always drive the control arm 40 toward the neutral position, i.e., closing of the forward sense switch 20 ultimately provides a voltage signal causing the actuator 16 to drive the control arm 40 toward a reverse position and closing of the reverse sense switch 22 ultimately provides a voltage signal causing the actuator 16 to drive the control arm 40 toward the forward position. Once the control arm 40 reaches the neutral position, switches 20 and 22 will be open and the actuator 16 will no longer be energized or activated by the voltage signal provided via the brake switch.

While the embodiments of the present invention that are described in FIGS. 3 and 4 provide a means of electronically positioning the control arm 40 of a hydraulic pump, IHT or HST, and returning the control arm 40 to the neutral position when the brake is activated, it may also be desirable to provide for electronically positioning the control arm 40 in response to predefined conditions that may arise during normal operation of lawn and garden vehicles, such as lawn and garden tractors and utility vehicles.

In the embodiment shown in FIG. 4, if control handle 14 is positioned to move the vehicle in either a forward or reverse direction and the brake is then activated, the actuator 16 may be used to drive the control arm 40 toward the neutral position. However, if the brake is subsequently released and control handle 14 remains in the forward position, then actuator 16 may again cause the vehicle to drive forward. In a further example and as shown in FIGS. 3 and 4, if the ignition of the vehicle is turned off while the actuator 16 is in a forward position and the ignition is subsequently turned on again, IHT/HST 38 may immediately try to drive the vehicle in the direction corresponding to the position in which the control handle 14 was last set.

For positioning the control arm 40 in response to predefined operating conditions, an electronic actuation drive 10 may be provided, which is capable of providing one or more of the following functions: (1) return the control arm 40 to neutral automatically when the engine is turned off; (2) return the control arm 40 to neutral automatically when the brake is activated; (3) require the control handle 14 to be returned to the neutral position prior to re-activating the drive voltage to the actuator 16; (4) disconnect the voltage signal to any control or drive components when the control arm 40 is in the neutral position and the key to the vehicle is in the off position so as to prevent the battery 11 from being drained; (5) drive the control arm 40 to match the orientation of the control handle 14 by comparing the output voltage signals associated with the control handle 14 and the control arm 40, and then moving the control arm 40 to match the position of the control handle 14; or (6) provide hysteresis in connection with the comparison electronics to prevent oscillation or dither of the actuator between the forward and reverse drive modes.

Figure 5:
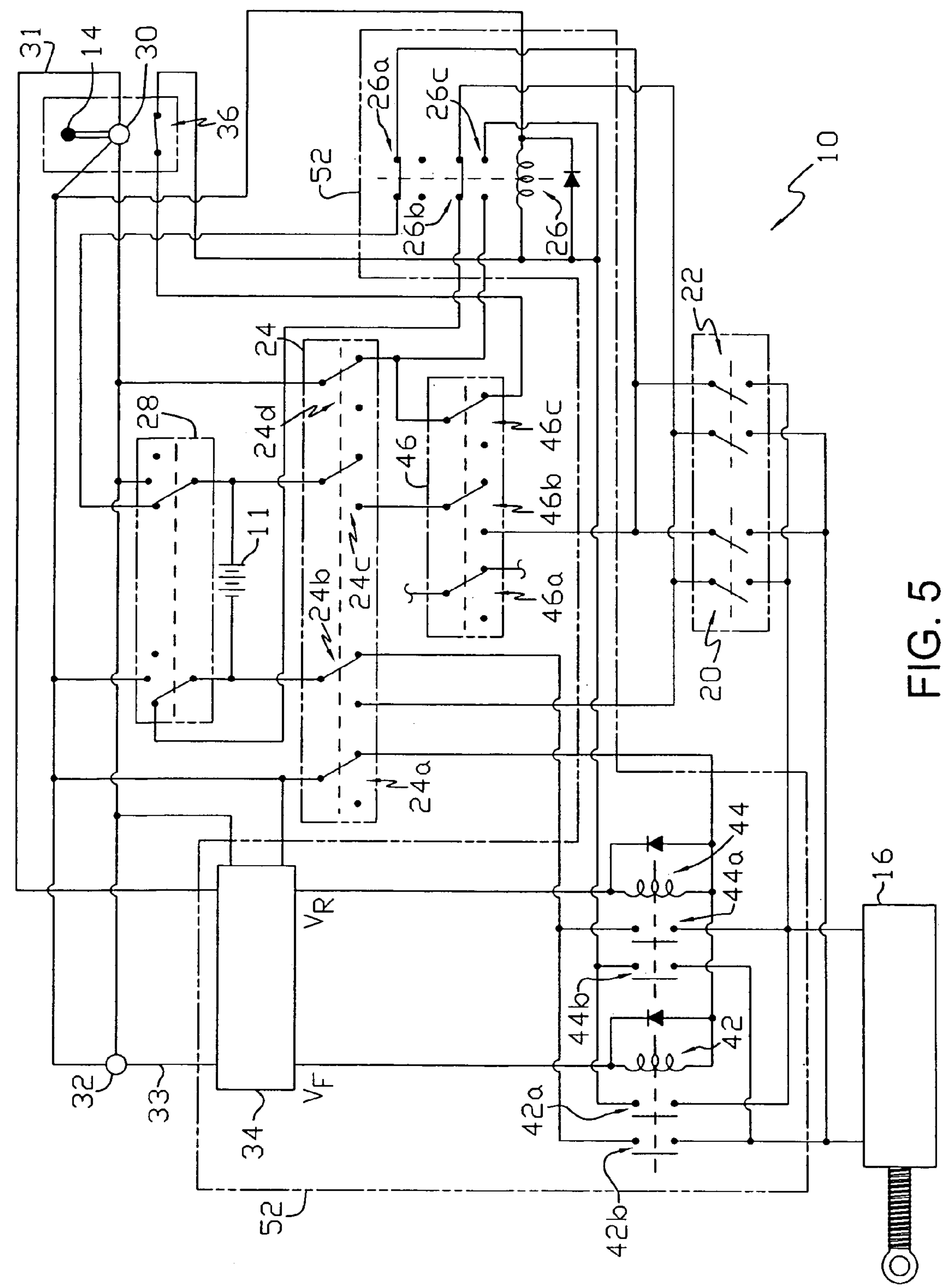
FIG. 5 is an electrical schematic illustrating an exemplary circuit for a electronic actuation drive system using Hall Effect sensors to establish the position of an electric drive.
Figure 6:
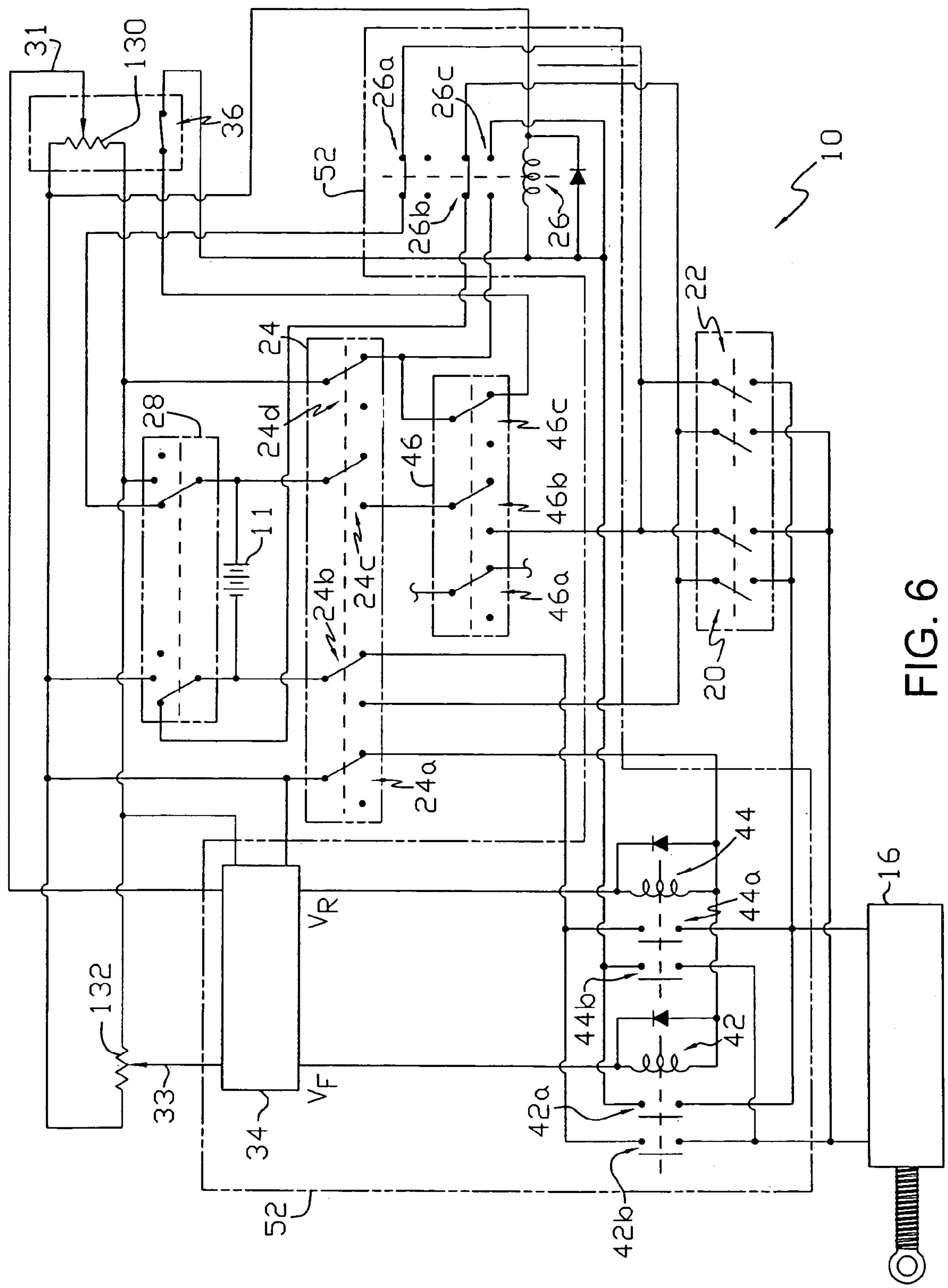
FIG. 6 is an electrical schematic illustrating an exemplary circuit for an alternative embodiment of the circuit shown in FIG. 5 using potentiometers to establish the position of an electric drive.

More particularly, FIGS. 5 and 6 show two variations of the electronic actuation drive or EAD 10, which are nearly identical, except that the Hall Effect sensors 30 and 32 in FIG. 5 are replaced with variable potentiometers 130 and 132, respectively, in FIG. 6. All other components in FIG. 6 share the same numbering as those in FIG. 5 and are functionally identical to the components in FIG. 5. While the potentiometers 130 and 132 can provide a voltage output signal similar to that of the Hall Effect sensors 30 and 32, the latter are more desirable because they are less sensitive to environmental conditions such as moisture and debris.

1. Engine Off Function.

The EAD circuits shown in FIGS. 5 and 6 may drive actuator 16 to the neutral position when the engine is off regardless of the position of the control arm 40. For example, when ignition switch 28, which may also be a relay or a combination of more than one switch or relay, is in the off position, voltage signals are directed through contacts 26*a* and contacts 26*b* of relay 26. These voltage signals are then connected to switches 20 and 22. If either forward sense switch 20 or reverse sense switch 22 is closed, indicating the control arm 40 is in a forward or reverse position, respectively, then a voltage signal will be supplied to actuator 16. In this configuration, forward sense switch 20 is designated as the forward position sensor and, when closed, allows a voltage signal to drive actuator 16 in the reverse direction so as to move the control arm 40 and the swash plate 56 toward the neutral position.

Once the control arm 40 and the swash plate 56 are in the neutral position, switch 20 opens and a voltage signal is no longer supplied to the actuator 16. Conversely, when reverse sense switch 22 is closed, a voltage signal causes the actuator 16 to drive the control arm 40 toward the neutral position until switch 22 opens and a voltage signal is no longer supplied to the actuator 16. It should be appreciated that when switches 20 and 22 are both open, the control arm 40 will have been returned to the neutral position; therefore, a voltage signal is no longer supplied to the actuator 16. Furthermore, when the ignition switch 28 is in the off position and the control arm 40 is in neutral, no voltage signal is supplied to any control or drive components, which functions to prevent the battery from being drained.

By way of further example, if the ignition switch 28 is in the middle or operating position, a voltage signal is supplied to Hall Effect sensors 30 and 32, comparator 34, and, if control handle 14 is in the center or neutral position and the brake is not activated, to relay 26. Once relay 26 is activated, a voltage signal will be directed through contacts 26*c*, which will provide an additional voltage path to maintain relay 26 in an activated condition. Therefore, relay 26 will remain in a self-holding state until the brake pedal is depressed or until the ignition switch 28 is turned to the off position. Relay 26 also provides a voltage signal to contacts 42*a* of forward actuation relay 42 and contacts 44*b* of reverse actuation relay 44. Further, control handle neutral switch 36 is coupled to the control handle 14 and will only be closed when the control handle 14 is in the neutral position. Thus, before a voltage signal may be supplied to self-holding relay 26, the control handle 14 must be in the neutral position (thereby closing switch 36), the control arm 40 must be in the neutral position (thereby closing contacts 46*c* of neutral sense switch 46), and the brake must be released (thereby deactivating brake switch 24).

To prevent the engine from being started when the control arm 40 is not in the neutral position, contacts 46*a* of switch 46 may be included as part of the engine start circuit. Hence, even if another portion of the actuator circuitry allows the engine to be started with the control arm 40 in a forward or reverse position due to a system failure, such as a disconnected wire or failed switch, the engine start circuit will still prevent the engine from being started.

2. Comparison of Control Handle to Control Arm Positions.

For enabling the EAD 10 to synchronize the output positions of the control handle 14 and the control arm 40 by comparing the output voltages associated therewith, Hall effect sensors 30 and 32 are provided. Hall effect sensors 30 and 32 are linear sensors and in the preferred embodiment of the present invention they are rotational linear sensors. The hall effect sensors 30 and 32 are attached to the rotating control handle 14 and the rotating control arm 40 and have a constant voltage output signal proportional to the rotational position of a magnet with respect to the Hall Effect sensor. Other types of Hall Effect linear sensors may be attached to other portions of the control and actuation linkage (not shown). The range of rotation is preferably −20 degrees from neutral to +20 degrees from neutral. As the rotation of the Hall Effect sensor 30 changes from the −20 degree position to the +20 degree position, an increasing output voltage signal is generated by Hall Effect sensor 30 and directed to comparator 34 via wire 31. Hall Effect sensor 32 also generates a similar output voltage signal, which is directed to comparator 34 via wire 33.

For comparing the output voltage signal from Hall Effect sensors 30 and 32 and for rotating the control arm 40 until it is synchronized with the control handle 14, comparator 34 is provided. If the output voltage signal from sensor 30 is at a higher level than the output voltage signal from sensor 32, then the comparator 34 will send a voltage signal VF to activate relay 42, which then applies a voltage signal to actuator 16 in a polarity that drives the control arm 40 in the forward direction. As the control arm 40 rotates, rotating the Hall Effect sensor 32 with it, the voltage signal from Hall Effect sensor 32 increases until it reaches the level of the voltage signal from Hall Effect sensor 30, at which time the comparator 34 turns voltage signal $V_F$ off, deactivating relay 42. If the voltage from sensor 30 is lower than the voltage signal from sensor 32, then the comparator 34 will send a voltage signal $V_R$ to activate relay 44 and the actuator 16 will drive the control arm 40 in the reverse direction until the voltage signal level from sensor 32 matches that of sensor 30 and voltage signal $V_R$ is turned off.

As comparator circuits are well known to those of ordinary skill in the art, it should be appreciated that comparator 34 may also consist of a pair of operational amplifiers, a logic circuit, or a variety of other circuit configurations designed to compare two voltage signals. Further, while the drive voltage signals are shown as being connected through a variety of switches and relays, it should be understood that such switches and relays may be replaced with other electrical components offering similar functions. The relays 26, 42, and 44 and comparator 34 are preferably located in control module 52, which is preferably located in a position away from the HST/IHT and the vehicle engine.

3. Hysteresis In Comparator.

To prevent the continuous oscillation of the actuator 16 between the forward and reverse directions, comparator 34 may include a circuit that adds hysteresis to the voltage signals from sensors 30 and 32. The hysteresis will be selected based on the operating conditions of a particular vehicle and will cause comparator 34 to activate relays 42 and 44 only if control handle 14 is moved. Adding hysteresis to comparator circuits is also known to those with ordinary skill in the art and has been described in various technical magazines and books.

4. Brake Activation.

The circuits shown in FIGS. 5 and 6 are also capable of driving the control arm 40 to the neutral position when the brake is activated. For example, assuming the ignition switch 28 is in the center or on position and the control handle 14 is in the neutral position, the relay 26 will be activated. After the relay 26 is activated and if the control handle 14 is moved in a forward or reverse direction, the comparator will cause the actuator 16 to rotate the control arm 40 accordingly so that the vehicle begins moving in the selected direction. At this time, if the brake is activated, brake switch 24 will switch opposite to the position shown in FIGS. 5 and 6. When contacts 24*d* assume the open position, switch relay 26 will become deactivated, which removes the drive voltage signal from relays 42 and 44. When contacts 24*a* assume the open position, the voltage signal may also be disconnected from relays 42 and 44. Contacts 24*b* provide a voltage signal to forward sense switch 20 and reverse sense switch 22, while removing a voltage signal from contacts 42*b* and 44*a*. As noted above, if the operator has positioned the control handle 14 to cause the vehicle to be in motion, the neutral switch 46 located on the control arm 40 will be switched to the position opposite that shown in FIGS. 5 and 6. Therefore, when the brake switch 24 is activated a voltage signal will be directed through contacts 24*c* to contacts 46*b* and then also to switches 20 and 22. Since the vehicle is in motion, either forward sense switch 20 or reverse sense switch 22 will be closed, and the voltage signal applied to the respective switches 20, 22 will then be connected to the actuator 16. As a result of receiving a voltage signal via the closure of switch 20 or 22, actuator 16 will drive the control arm 40 toward the neutral position until neutral is reached and switches 46, 20 and 22 are returned to the state shown in FIGS. 5 and 6, at which time actuator 16 will stop driving the control arm 40. As previously noted, prior to reactivating the self-holding relay 26, the HST/IHT 38 must have achieved the neutral position (thereby closing switch 46*c*), the control handle 14 will need to be returned to the neutral position (thereby closing switch 36) and the brake will need to be released (thereby deactivating brake switch 24). Once the self-holding relay 26 is reactivated, the EAD 10 will again be able to supply voltage signals to actuator 16.

FIG. 7 illustrates a further embodiment of the present invention wherein the actuator mechanism 16 is mounted internally with respect to the IHT 38. The side housing 54 was removed in FIG. 7 to expose the configuration of the internal components, while leaving Hall Effect sensor 32 in place. In the illustrated embodiment, Hall Effect sensor 32 is mounted external to side housing 54 and extends through the side housing to mate with swash plate 56 or control arm 140. FIG. 7 also illustrates the internal details of other components in housing 55. An input shaft 58 drives pump 60 mounted on center section 62. In a transmission configuration, a motor (not shown) is driven through porting within center section 62. The motor is connected to a motor shaft 63 that drives the motor shaft gear 64, which then drives other elements of the gear train 66. The gear train 66 may drive a single axle shaft or may be further comprised of a differential 68, which is capable of driving two or more axle shafts 70.

Figure 11:
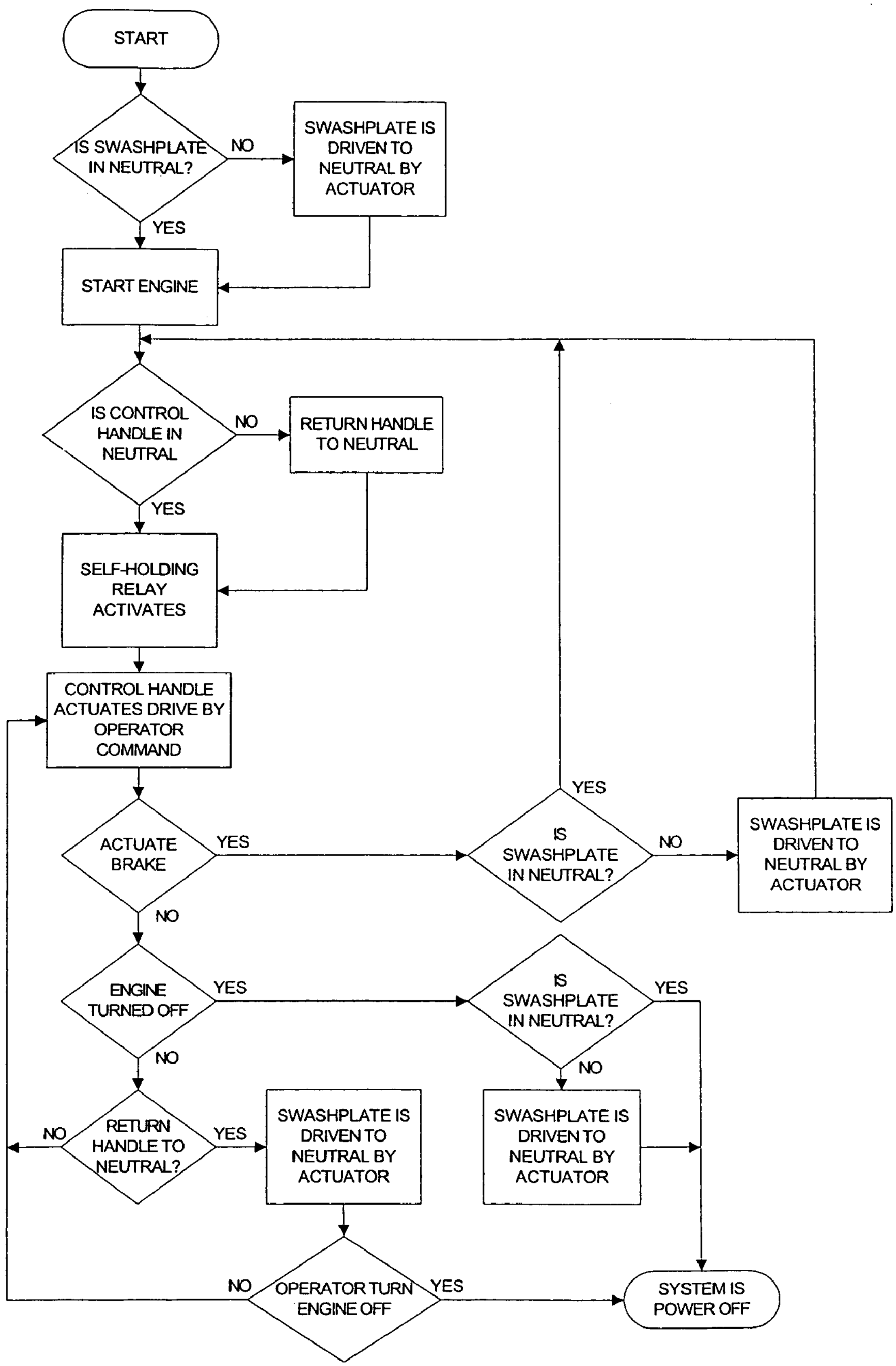
FIG. 11 is a flow chart illustrating an exemplary method of operation for the drive system circuitry shown in FIGS. 5 and 6.

As exemplified in FIG. 11, an electronic actuation drive 10 is provided for detecting predefined conditions and electronically controlling the positioning of the control arm 40 and the swash plate 56 in response to those predefined conditions. For example, in its "start" position, the EAD 10 will initially detect whether the swash plate 56 is in neutral. If the swash plate 56 is not in neutral, the EAD 10 will drive the swash plate 56 back to the neutral position; the operator may not be able to start the engine, unless the swash plate 56 is in the neutral position. If the swash plate 56 is in neutral, the operator may be permitted to start the engine. It should also be appreciated by those with skill in the art that as an added protection against starting a vehicle that may already be in the forward or reverse drive positions, the EAD 10 may also require the control handle 14 to be in the neutral position prior to allowing the operator to start the vehicle.

When the engine is started, the EAD 10 will then determine whether the vehicle is in operation mode, i.e., whether the control handle 14 is in neutral. When the control handle 14 is not initially in the neutral position, the operator is unable to move the vehicle in a forward or reverse direction. The EAD 10 will not activate the self-holding relay 26 until the EAD 10 determines that the swash plate 56 and control handle 14 are in neutral and the engine is on.

After the self-holding relay 26 becomes activated, the operator may actuate the EAD 10 in the forward or reverse direction by shifting the control handle 14 to the desired position. In addition, once the self holding relay is activated, the EAD 10 may recursively test for whether the brake has been activated, the engine has been turned-off, and the control handle 14 has been placed in the neutral position.

If the brake is activated, the EAD 10 may function to detect whether the swash plate 56 is in neutral. If the swash plate 56 is not in neutral, the EAD 10 may then drive the swash plate 56 back to the neutral position. Once the swash plate 56 is in the neutral position, the EAD 10 may again test for whether the vehicle is in operation mode, as described above. Therefore, once the brake has been activated, the EAD 10 may require the control handle 14 to be returned to the neutral position before re-establishing operator control over the EAD 10. As long as the brake is not activated and the engine is still running, the vehicle should continue to respond to movements of the control handle 14.

If the brake is not activated, the EAD 10 may then determine whether the engine has been turned-off. If the engine has been turned-off, the EAD 10 may detect whether the swash plate 56 is in neutral. If the swash plate 56 is not in neutral, the EAD 10 may drive the swash plate 56 back to the neutral position. After the swash plate 56 is in the neutral position, the EAD 10 will be in a power-off state and no voltage will be applied to any electronics until the next time the engine is started.

If the engine has not been turned-off, the EAD 10 may detect whether the control handle is in the neutral position. If the control handle 14 is not in the neutral position, the engine is still running and the brake has not been activated, then the EAD 10 may continue to test for those conditions. If the control handle 14 is in the neutral position, the swash plate 56 will be driven to the neutral position. It should be appreciated that the operator may periodically return control handle 14 to neutral for various operational reasons. When the control handle 14 is in neutral and the vehicle has stopped, the operator may elect to either move the control handle 14 from the neutral position and drive the vehicle forward or backward, or the operator may decide to turn the vehicle engine off. If the engine is turned-off, the EAD 10 will be in a power-off state and no voltage will be applied to any electronics until the next time the engine is started.

Figure 8:
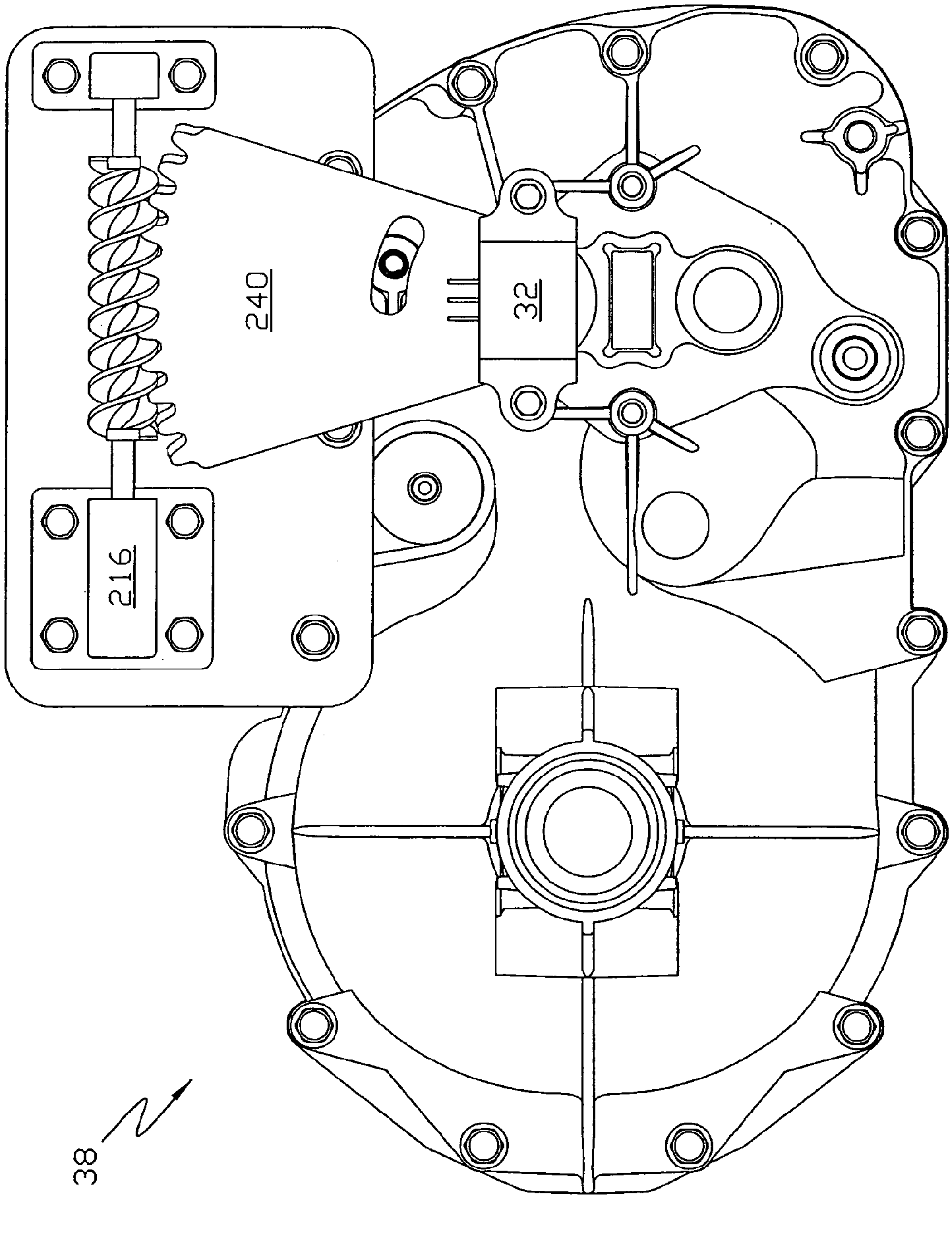
FIG. 8 is a close up view of an alternative embodiment of the IHT shown in FIG. 2 including a worm gear as part of the actuator mechanism.

While the preferred embodiment of the present invention includes a linear actuator 16, it should be understood that the linear actuator 16 may be replaced with other means which produce a similar result. For example, as shown in FIG. 8, the linear actuator may be replaced with a worm gear drive 216, which is drivingly associated with an appropriately configured control arm 240.

Figure 9:
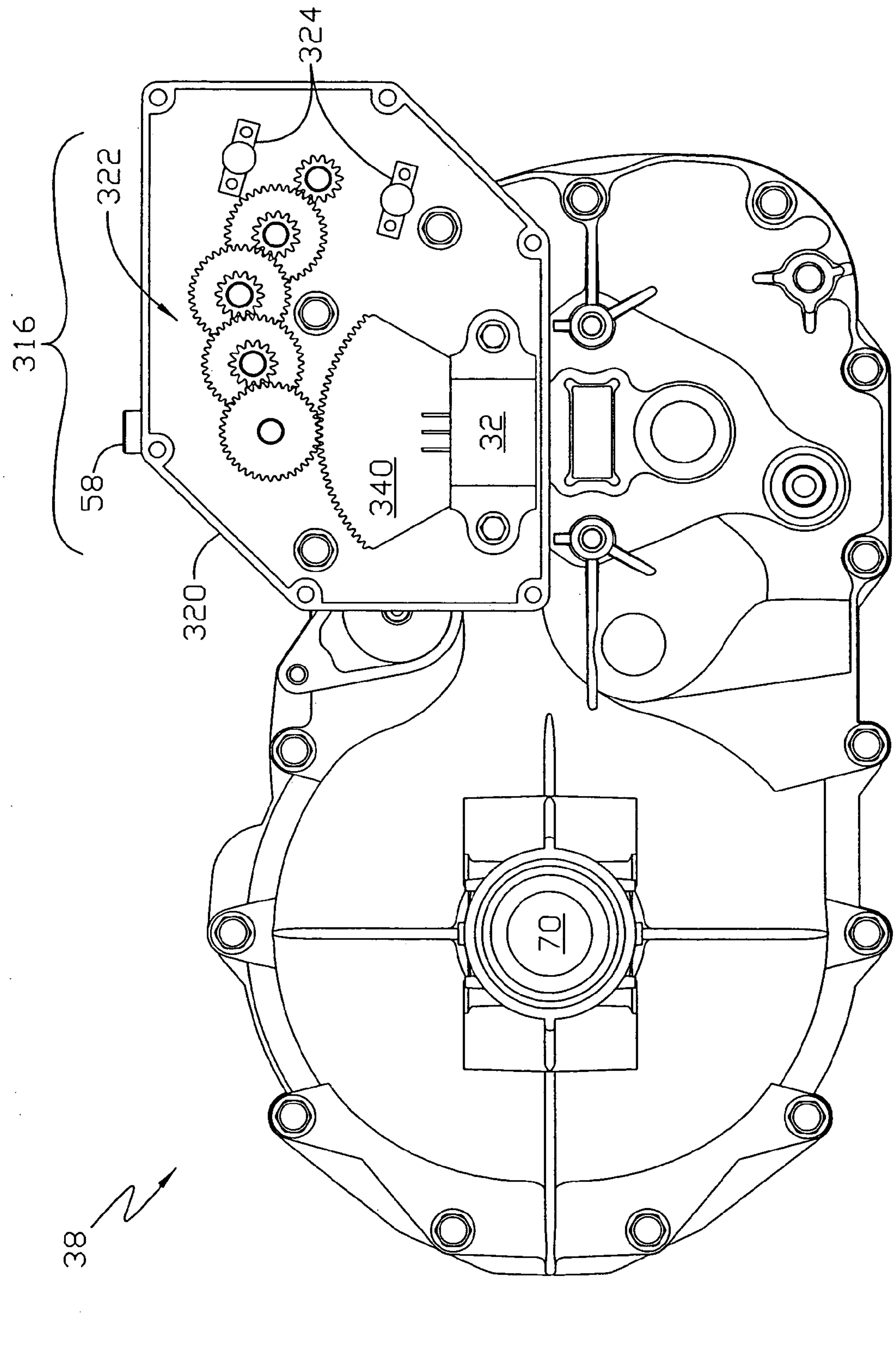
FIG. 9 is a close up view of an alternative embodiment of the IHT shown in FIG. 2 including a spur gear configuration as part of the actuator mechanism.
Figure 10:
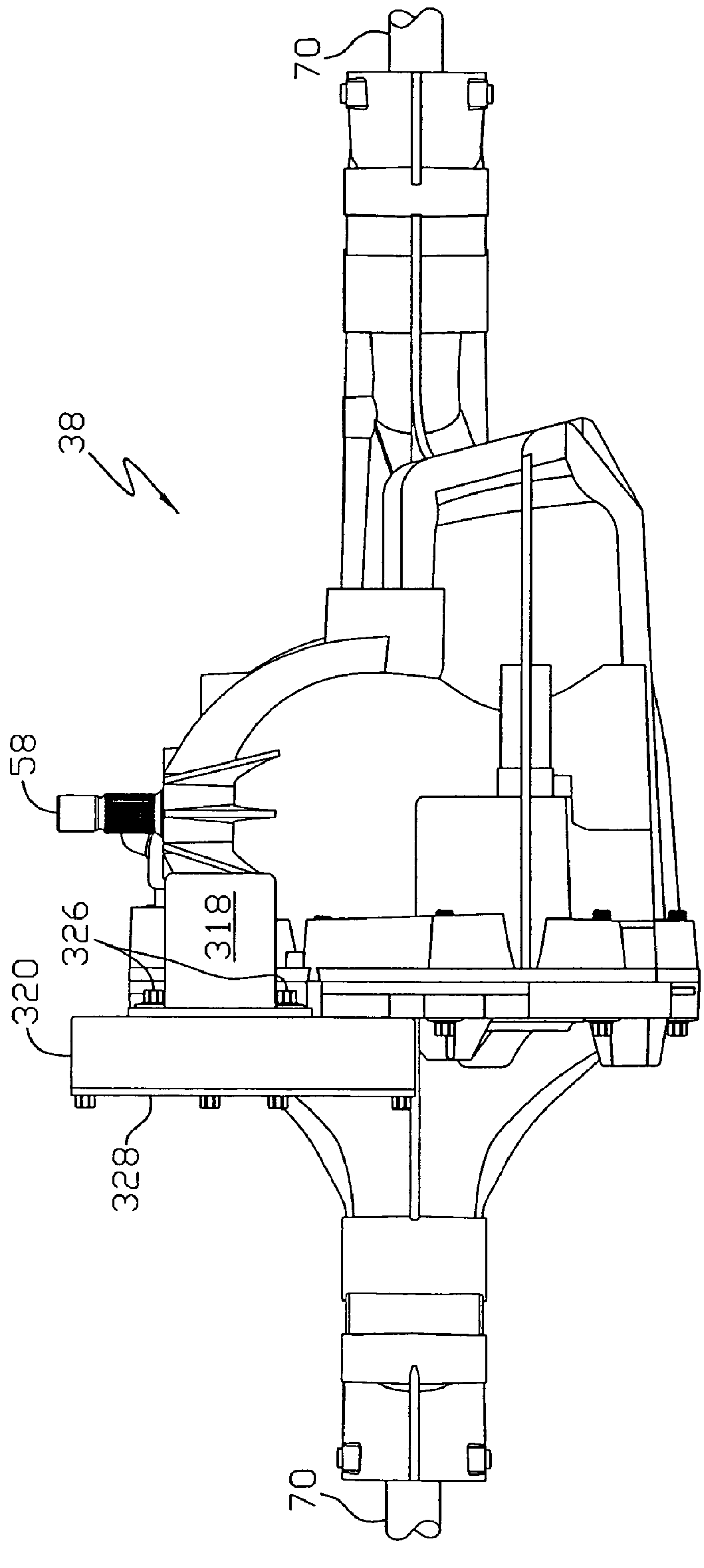
FIG. 10 is a front view of the IHT shown in FIG. 9.

In addition, as shown in FIGS. 9 and 10, the linear actuator may also be replaced with a spur gear reduction actuator 316. This configuration may consist of a suitable enclosure 320, such as a housing, that may then be enclosed with a cover 328. This enclosure may also be configured to inhibit entry of contaminants, such as dirt and moisture, by use of appropriate seals. The actuator 16 may be further comprised of one or more gear reductions 322 that are drivingly coupled with control arm 340. Mounting of a drive motor 318 to enclosure 320 may be achieved through a variety of methods currently known in the art, such as nut plates 324 and bolts 326.

While specific embodiments of the invention have been described in detail, it will be appreciated by those skilled in the art that various modifications and alternatives to those details could be developed in light of the overall teachings of the disclosure. Accordingly, the particular arrangement disclosed is meant to be illustrative only and not limiting as to the scope of the invention which is to be given the full breadth of the appended claims and any equivalents thereof. For example, the method described with respect to electronic actuation of an axle driving apparatus can be performed in hardware or software without departing from the spirit of the invention. Furthermore, the order of all steps disclosed in the figures and discussed above has been provided for exemplary purposes only. Therefore, it should be understood by those with skill in the art that these steps may be rearranged and altered without departing from the spirit of the present invention.

What is claimed is:

1. A drive system for electronically controlling a hydraulic pump, comprising:
 an operator control handle associated with an electronically driven swash plate; and
 an electronic circuit to sense the non-neutral position of the swash plate, wherein the swash plate is driven to a neutral position from a non-neutral position independent of the position of the operator control handle in response to a predefined condition.

2. The system as described in claim 1, wherein the predefined condition is actuation of a brake.

3. The system as described in claim 1, wherein the predefined condition is deactivation of a vehicle engine.

4. The system as described in claim 1, wherein after the occurrence of the predefined condition, the operator control handle is required to be moved to the neutral position to link movement of the swash plate to movement of the operator actuation handle.

5. The system as described in claim 1, wherein voltage is removed from all electronic circuits after the swash plate is returned to the neutral position.

6. The system as described in claim 1, wherein there are a plurality of predefined conditions.

7. The system as described in claim 6, wherein the electronic circuit is recursively tested for one of the plurality of predefined conditions.

8. A vehicle, comprising:
 a prime mover;
 an ignition switch associated with actuating the prime mover;
 an electronically controlled hydraulic pump; and
 an electronic circuit to sense a non-neutral position of the hydraulic pump, wherein the ignition switch is prevented from actuating the prime mover in response to existence of a predefined conditioned.

9. The vehicle of claim 8, wherein the vehicle is further comprised of an operator control handle coupled to an electronically driven swash plate.

10. The vehicle of claim 9, wherein the predefined condition is a non-neutral position of the swash plate.

11. The vehicle of claim 9, wherein the predefined condition is a non-neutral position of the operator control handle.

12. The vehicle of claim 11, wherein after occurrence of a predefined condition, movement of the operator control handle to the neutral position enables the ignition switch to actuate the prime mover.

13. The vehicle of claim 12, wherein after occurrence of a predefined condition, movement of the operator control handle to the neutral position actuates a relay that enables the ignition switch.

14. The vehicle of claim 9, further comprising a sensing element to determine the position of the operator control handle and using that position to drive the swash plate to a matching position.

15. The vehicle of claim 14, where the sensing element is a variable resistor.

16. The vehicle of claim 14, where the sensing element is a Hall Effect sensor.

17. A transaxle drive device, comprising:

a housing a rotatable hydraulic cylinder positioned within the housing;

a swash plate cooperable with the hydraulic cylinder to vary the displacement of the hydraulic cylinder;

a trunnion arm drivingly connected to the swash plate, whereby the swash plate rotates around the axis of the trunnion arm;

a control arm located within the housing and attached to the trunnion arm; and an electronic drive operatively engaged to the control arm.

18. The transaxle drive device of claim 17, wherein the electronic drive is a linear actuator.

19. The transaxle device of claim 18, wherein the electronic drive is attached to the control arm at a point radially separated from the center of rotation of the control arm.

20. The transaxle drive device of claim 17, wherein the electronic drive further comprises a gear reduction.

21. The transaxle drive device of claim 20, wherein the electronic drive further comprises a gear formed on the periphery of the control arm.

22. The transaxle drive device of claim 17, wherein the electronic drive further comprises a worm gear.

23. The transaxle drive device of claim 17, wherein the axis of rotation for the swash plate and the trunnion arm are identical.

24. A transaxle drive device comprising:

a housing;

a rotatable hydraulic cylinder positioned within the housing;

a swash plate cooperable with the hydraulic cylinder to vary the displacement of the hydraulic cylinder;

a trunnion arm drivingly connected to the swash plate, whereby the swash plate rotates around the axis of the trunnion arm;

a control arm attached to the trunnion arm; and an electronic drive operatively engaged to the control arm, wherein the position of the control arm is indicated by a Hall Effect sensor.

25. The transaxle drive device of claim 24, wherein the control arm is located within the housing.

26. The transaxle drive device of claim 24, wherein the control arm is located outside the housing.

27. The transaxle drive device of claim 24, wherein the electronic drive is a linear actuator.

28. The transaxle drive device of claim 24, wherein the electronic drive further comprises a gear reduction.

29. A transaxle drive device comprising:

a housing:

a rotatable hydraulic cylinder positioned within the housing;

a swash plate cooperable with the hydraulic cylinder to vary the displacement of the hydraulic cylinder;

a trunnion arm drivingly connected to the swash plate, whereby the swash plate rotates around the axis of the trunnion arm;

a control arm attached to the trunnion arm; and an electronic drive operatively engaged to the control arm, wherein the position of the control arm is indicated by a variable potentiometer.

30. The transaxle drive device of claim 29, wherein the control arm is located within the housing.

31. The transaxle drive device of claim 29, wherein the control arm is located outside the housing.

* * * * *